UNITED STATES PATENT OFFICE 2,565,507

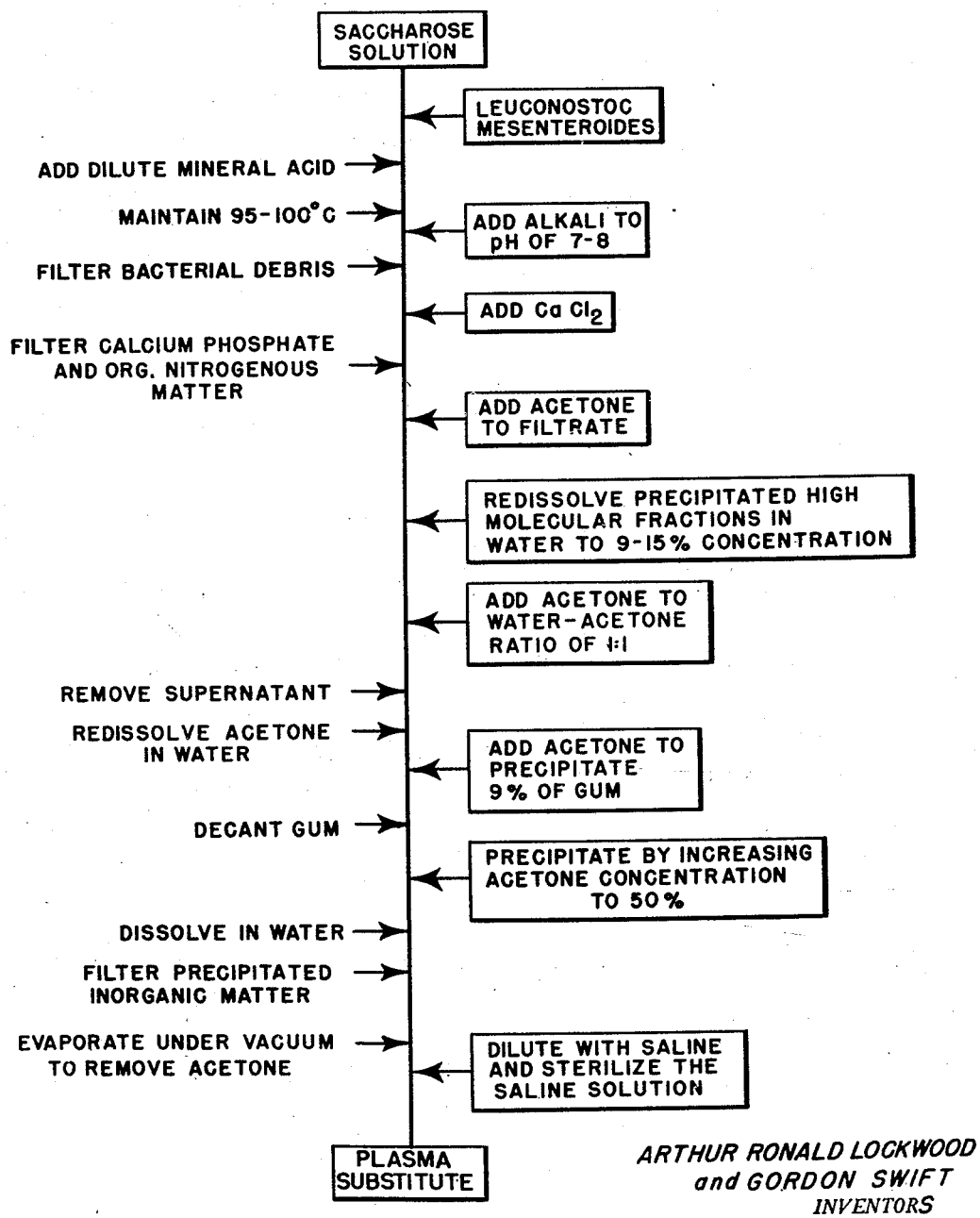

DEGRADATION OF DEXTRAN TO PRODUCE A PLASMA SUBSTITUTE

Arthur Ronald Lockwood and Gordon Swift, Darlington, England, assignors, by mesne assignments, to Tell & Usher Limited, Orange, N. J., a corporation of New Jersey Application July 19, 1948, Serial No. 39,583
In Great Britain July 28, 1947

4 Claims. (Cl. 167—78)

This invention relates to the degradation of dextran and in particular to the production of products containing degraded or depolymerised dextran suitable for therapeutic use and in particular as a substitute for blood plasma.

The invention, as is schematically shown in the accompanying flow sheet, which forms a part hereof, consists broadly in the treatment of a fermentation product obtained by the action of *Leuconostoc mesenteroides* or a similarly acting organism on saccharose solutions for a comparatively long period with dilute mineral acid at temperatures of 95–100° C., adjusting the pH value of the resultant solution to 7–8 by the addition of dilute alkali whereby bacterial debris is caused to separate out, treating the resultant solution or dispersion to effect the removal of the bulk of the phosphate ion by the addition thereto of a proportion of calcium chloride less than the calculated amount necessary to remove the whole of the phosphate ion present, the precipitated calcium phosphate which is formed serving as a vehicle for removing from the solution a large proportion of the remaining organic nitrogenous matter, separating the precipitate, and effecting the fractional precipitation of the degraded dextran by the employment of acetone.

Thus, in accordance with the invention, to the filtrate there may be added acetone to precipitate the high molecular fraction of the hydrolytic products, re-dissolving such high molecular fractions in water to obtain a solution of degraded dextran of a relatively high concentration, for instance, a concentration of the order of 9 or 10 to 15%, adding acetone to give a water-acetone ratio of 1:1, removing the supernatant acetone and repeating the precipitation so that by this method of plurality of precipitation, the non-dextran content is brought to a satisfactory minimum level as dictated by the pharmaceutical requirements of the product.

At this point it may be mentioned that while the method of successive acetone precipitation as described in the preceding paragraph does serve to give an essentially consistent fraction with respect to mean molecular weight, it has been found an advantage to carry out partial fractionation of the product at the second precipitation stage by adding 98% acetone to the vigorously agitated aqueous solution until the threshold of precipitation is just attained (15 to 20% by volume acetone), then stopping the agitation so that a small aggregation of gum amounting to some 8% of the whole separates out, removing this gum by decantation and precipitating the remaining dextran by increasing the acetone concentration up to 50%.

This technique ensures the removal of a very high percentage of residual dextran of molecular weight considerably in excess of the mean.

Further it may be stressed that enormous advantage is to be obtained in processing degraded dextran by precipitation with solvent as compared with processes requiring the precipitation of the undegraded material from the aqueous solution. Raw dextran in the undegraded state comes out of solution with acetone or alcohol in a semi-solid sticky mass which is extremely difficult to handle and does not lend itself to transfer in processes by any known or practical methods. On the other hand once the dextran has been degraded as described in the method, the separated gum after precipitation behaves substantially as a fluid, flows readily through pipes and in particular can be separated from the supernatant liquor by simple gravity decanters without adherence of any major part of the material to the walls of the processing vessels.

To obtain a solution of dextran suitable for intravenous injection, the dextran gum so obtained is dissolved in water, any inorganic matter precipitated is removed by filtration or centrifugation, the resultant solution is evaporated under vacuum to remove final traces of acetone and then diluted with saline solution to obtain a final stable concentration of saline and dextran, free from pyrogenic and particulate matter and thereafter sterilising the saline dextran solution by for instance steam autoclaving.

We have found that material produced by the method quite satisfactory for intravenous injection in that no major physiological reactions have been detected so far and the material has not been found antigenic or pyrogenic and so far as we know no local irritation at the site of injection has been encountered.

We have, however, found that it is entirely practical to reduce the inorganic ion content of the material very considerably in order to ensure complete freedom from possible undesirable side reactions (the physiological saline is not included under this heading of course).

Thus, the material may be dialysed.

Preferably, in accordance with the invention, the final traces of inorganic ions are removed by the passage of the dispersion of dextran of approximately 8 to 10% concentration through cation and anion exchanging substances prior to a treatment with activated charcoal followed by Seitz filtration or other treatment to remove particulate matter.

As the cation and anion exchanging substances, the resins known under the trade name "Soucol and Wofatit," phenolic cationite material, may be used.

It may be mentioned that no serious loss of dextran results in such treatment which may be accounted for by the fact that depolymerised or degraded dextran no longer behaves as an electrically charged colloid.

The treatment in question has this advantage also that it is more economical than such a tedious method as dialysis.

Preferably in accordance with the invention, the dextran is obtained from solutions of refined sugar and in particular in the manner described in our co-pending application for Letters Patent No. 39,584, filed July 19, 1948.

Preferably, in accordance with the invention, the viscosity of the degraded dextran is assessed by following the decrease in viscosity of the fermentation fluid undergoing degradation with time.

Thus it has been found that the relative viscosity of the fermentation fluid and time of degradation in minutes may bear the relation given in the accompanying table:

| Relative viscosity of fermentation fluid (with respect to water) | Time of degradation, in minutes |
| --- | --- |
| 19 | 30 |
| 10 | 60 |
| 6 | 120 |
| 5.2 | 150 |
| 4.3 | 180 |
| 3.5 | 240 |

At the end of an appropriate time of degradation, the viscosity of the degraded dextran may be determined accurately by precipitation from the fluid with acetone and redissolving the precipitated material in distilled water at a known concentration. By this means, it will be seen to be practical to stop the degradation at any predetermined viscosity for the degraded material. Careful check on the solid content of the precipitated samples is necessary in order to assay the quantity of dextran which has been completely hydrolysed to glucose.

The following particulars are given as an example of an appropriate method of carrying the invention into effect:

The fermentation fluid described in the specification of our co-pending application No. 39,584, filed July 19, 1948 (20 litres) is treated with 40 c. c. of concentrated sulphuric acid so that the normality of the fluid with respect to sulphuric acid at the commencement of the degradation is approximately $$\frac{3N}{40}$$

The acid mixture is then kept at 95–100° C. for a period of four to five hours, during which time the decrease in viscosity of the fermentation fluid is followed as a measure of the extent of the polysaccharide degradation. The solution is then cooled, brought to pH 7.5–8.0 by the addition of aqueous sodium hydroxide or sodium carbonate when a flocculent precipitate is formed. To the solution is then added 0.8 gm. of calcium chloride per 500 cc. of original fluid. The solution is then warmed to 50–60° C. in order to flocculate the calcium phosphate, calcium sulphate and other extraneous matter and this combined precipitate removed by filtration or centrifugation. The dextran is then precipitated by the addition of an equal volume of acetone, the supernatant liquid removed and the dextran dissolved in ⅓ its original volume, i. e. 6 to 7 litres of salt and water of which the salt is 0.09 per cent. The precipitation is then repeated twice and the degraded dextran gum made up with distilled water to a concentration of 5%. All concentrations are determined by solid content assay on aliquots. The precipitate remaining at this stage is then removed by filtration or centrifugation and the resultant solution boiled under reduced pressure until the concentration is 8%. To this is added the required amount of sodium chloride, the pH adjusted to 7.0 and the solution diluted to 6% by the addition of sterile pyrogen-free water, 0.1% of activated charcoal is added and the solution is then freed from particulate matter by Seitz filtration, and passages through sintered glass filters, being finally autoclaved in suitable glass containers. At a concentration of 8.8% this solution has a relative viscosity with respect to water of 3.8 and in 6.8% solution a relative viscosity of 4.6 and a 6% solution had a reducing power expressed as glucose of 15–20 mgms. per 100 c. c.

A typical analysis of the final product obtained is given below.

Relative viscosity in 6% solution, 3.3–3.4
Reducing sugar content expressed as 15–20 milligrams of glucose per 100 cc.
Nitrogen content, less than 0.1 mgm. per 100 ml.
Phophate, trace Generally it may be stated that the invention in its preferred embodiment in which the fermentation fluid is obtained in accordance with our co-pending application No. 39,584, filed July 19, 1948 employs a non-coloured fermentation fluid which initially is relatively free from impurities.

The treatment with calcium chloride serves to precipitate a large proportion of the inorganic salts which are residual from the fermentation and at the same time as a vehicle for removing nitrogenous matter by adsorption on the calcium phosphate precipitate.

The method of successive acetone precipitation serves to give an essentially consistent fraction with respect to mean molecular weight and also to decrease the reducing sugar content to below the limit specified earlier. The acetone precipitation also reduces the residual inorganic matter remaining to a satisfactory level. The removal of reducing sugar by this method and at this particular stage serves to secure a further decolorising effect and also enables the solution to be autoclaved at various pHs without appreciable darkening of the fluid.

Further the method described gives a solution consisting almost entirely of a degraded dextran practically free from inorganic matter and residual sugars even without resorting to dialysis and/or the preparation of the pure undegraded dextran.

We claim:

1. A process of producing degradation products of dextran suitable as substitutes for blood plasma, which comprises treating a fermentation product obtained by the action of dextran-producing bacteria on saccharose solution with dilute mineral acid at temperatures of 95° to 100° C. adjusting the pH value of the resultant solution to 7-8 by the addition of dilute alkali whereby bacterial debris is caused to separate out, treating the resultant solution or dispersion to effect the removal of the bulk of the phosphate ion by the addition thereto of an amount of calcium chloride less than the calculated amount necessary to remove the whole of the phosphate ion present, the precipitated calcium phosphate which is formed serving as a vehicle for removing from the solution a large proportion of the remaining organic nitrogenous matter, separating the precipitate, and effecting the fractional precipitation of the degraded dextran with acetone.

2. The process of claim 1 wherein the fractional precipitation is effected by adding acetone to the filtrate in order to precipitate the high molecular fraction of the hydrolytic products, redissolving the precipitated high molecular fractions in water in order to obtain a solution of degraded dextran having a concentration from about 9 to 15%, adding acetone to give a water-acetone ratio of 1:1, removing the supernatant acetone and repeating the fractional precipitation procedure until the non-dextran content is brought to a satisfactory minimum level as dictated by pharmaceutical requirements.

3. The process of claim 2 wherein the partial fractionation of the reaction product at the second precipitation stage is effected by adding 98% acetone to the vigorously agitated aqueous solution until the threshold of precipitation is just attained, then stopping the agitation so that a small aggregation of gum amounting to about 9% of the whole separates out, removing this gum by decantation and precipitating the remaining dextran by increasing the acetone concentration up to 50%.

4. A process for obtaining a solution of dextran suitable for intravenous injection, which comprises dissolving in water the product obtained in accordance with claim 1, removing any precipitated inorganic matter, evaporating the resultant solution under vacuum to remove final traces of acetone, diluting the solution with a saline solution to obtain a final stable concentration of saline and dextran free from pyrogenic and particulate matter, and thereafter sterilizing the saline dextran solution.

ARTHUR RONALD LOCKWOOD.
GORDON SWIFT.

REFERENCES CITED

The following references are of record in the file of this patent:

UNITED STATES PATENTS

| Number | Name | Date |
|---|---|---|
| 1,616,168 | Arsem | Feb. 1, 1927 |
| 2,249,544 | Stahly | July 15, 1941 |
| 2,437,518 | Gronwall | Mar. 9, 1948 |
| 2,461,505 | Daniel | Feb. 15, 1949 |